(12) United States Patent
Sonobe

(10) Patent No.: US 11,442,310 B2
(45) Date of Patent: Sep. 13, 2022

(54) LIGHT-EMITTING DEVICE AND LIQUID CRYSTAL DISPLAY DEVICE

(71) Applicant: NICHIA CORPORATION, Anan (JP)

(72) Inventor: Koichiro Sonobe, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/128,058

(22) Filed: Dec. 19, 2020

(65) Prior Publication Data

US 2021/0200026 A1 Jul. 1, 2021

(30) Foreign Application Priority Data

Dec. 27, 2019 (JP) .............................. JP2019-239872

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133608* (2013.01); *G02F 1/133612* (2021.01); *G02F 1/133528* (2013.01); *G02F 1/133607* (2021.01)

(58) Field of Classification Search
CPC ......... G02F 1/133603; G02F 1/133612; G02F 1/133605
See application file for complete search history.

(56) References Cited

U.S. PATENT DOCUMENTS

| 4,706,130 A * | 11/1987 | Yamakawa | .......... H04N 1/1931 347/130 |
| 8,267,543 B2 | 9/2012 | Park | |
| 8,390,760 B2 * | 3/2013 | Ogihara | ............ G02F 1/133605 349/61 |
| 8,393,765 B2 | 3/2013 | Sugishita et al. | |
| 9,982,876 B2 | 5/2018 | Li et al. | |
| 10,643,556 B2 | 5/2020 | Kumamoto et al. | |
| 2007/0058143 A1* | 3/2007 | Penn | .................... H04N 9/3114 353/102 |

(Continued)

FOREIGN PATENT DOCUMENTS

| JP | S61-26202 U | 2/1986 |
| JP | 2001338505 A | 12/2001 |

(Continued)

*Primary Examiner* — Lucy P Chien
(74) *Attorney, Agent, or Firm* — Hunton Andrews Kurth LLP

(57) ABSTRACT

A light-emitting device includes a board on which light sources are disposed; a sectioning member including a ridge part having segments that configures a grid pattern, and a wall part surrounding the light sources, and extending from the ridge part toward the board such that an interval between two adjacent portions of the wall part joining along the ridge part becomes wider toward the board; and one or more integrated circuits configured to drive the light sources. The sectioning member and the integrated circuits are disposed on the same side of the board as the light sources. A space is defined between the back surface of the sectioning member and the board. One of the one or more integrated circuits is square or rectangular, and overlaps an intersection of segments of the ridge part, such that the sides are oblique with respect to the ridge part.

20 Claims, 11 Drawing Sheets

(56) References Cited

U.S. PATENT DOCUMENTS

| | | |
|---|---|---|
| 2015/0279760 A1 | 10/2015 | Miyawaki |
| 2018/0182940 A1 | 6/2018 | Yamamoto et al. |
| 2018/0196312 A1 | 7/2018 | Kumamoto et al. |
| 2018/0231838 A1 | 8/2018 | Kumamoto et al. |
| 2018/0233094 A1 | 8/2018 | Kumamoto et al. |
| 2018/0239195 A1 | 8/2018 | Kumamoto et al. |
| 2018/0240420 A1 | 8/2018 | Kumamoto et al. |
| 2018/0252966 A1 | 9/2018 | Kumamoto et al. |
| 2019/0285246 A1 | 9/2019 | Yamamoto et al. |
| 2020/0135993 A1 | 4/2020 | Yamamoto et al. |
| 2021/0325020 A1 | 10/2021 | Yamamoto et al. |
| 2022/0163185 A1 | 5/2022 | Yamamoto et al. |

FOREIGN PATENT DOCUMENTS

| | | |
|---|---|---|
| JP | 2002049036 A | 2/2002 |
| JP | 2005285336 A | 10/2005 |
| JP | 2008542994 A | 11/2008 |
| JP | 2009140720 A | 6/2009 |
| JP | 2010157394 A | 7/2010 |
| JP | 2011091126 A | 5/2011 |
| JP | 2013157173 A | 8/2013 |
| JP | 2015191939 A | 11/2015 |
| JP | 2016528665 A | 9/2016 |
| TW | 201830101 A | 8/2018 |
| WO | 2017038080 A1 | 3/2017 |
| WO | 2017038081 A1 | 3/2017 |
| WO | 2018066209 A1 | 4/2018 |

\* cited by examiner

LIGHT-EMITTING DEVICE AND LIQUID CRYSTAL DISPLAY DEVICE

CROSS-REFERENCE TO RELATED APPLICATIONS

The present application is based upon and claims the benefit of priority of the prior Japanese Priority Application No. 2019-239872 filed on Dec. 27, 2019, the entire contents of which are hereby incorporated by reference.

BACKGROUND

The present disclosure relates to a light-emitting device and a liquid crystal display device.

A light-emitting device that includes multiple light sources disposed in a matrix and a reflector to reflect light emitted from the light sources, has been known. In such a light-emitting device, the reflector is configured to include multiple lower-surface reflectors formed on the bottom of the light sources and multiple lateral-surface reflectors formed at the boundaries between the light sources (See, for example, Japan Examined Patent Publication No. 2008-542994).

A light-emitting device as described above requires an integrated circuit to drive the light sources, and the integrated circuit to drive the light sources is mounted, for example, on a separate board from the light-emitting device and disposed in the vicinity of the light-emitting device.

However, the above configuration requires a board separated from the light-emitting device, on which the integrated circuit is mounted; therefore, it has been difficult to make the entire light-emitting device including the integrated circuit smaller.

SUMMARY

One object of the certain embodiments of the present disclosure is to provide a small light emitting device that includes an integrated circuit.

A light-emitting device according to one embodiment in the present disclosure includes a board on which a plurality of light sources are disposed, a sectioning member including a ridge part and a wall part, and one or more integrated circuits configured to drive the plurality of light sources. The ridge part has a plurality of segments that configures a grid pattern in a top view. The wall part has a plurality of portions each surrounding one or more of the plurality of light sources in the top view, and extending from the ridge part toward the board such that an interval between two adjacent ones of the portions of the wall part joining each other along one of the segments of the ridge part becomes wider toward the board. The ridge part and the wall part form a plurality of regions to surround the plurality of light sources. The sectioning member and the integrated circuits are positioned on the same side of the board on which the plurality of light sources are disposed. A space is defined between a back surface of the sectioning member and the board. One of the integrated circuits has a square shape or a rectangle shape in the top view, and disposed at a position that overlaps an intersection of corresponding one of the segments of the ridge part in the space in the top view such that sides of the square or sides of the rectangle are oblique with respect to the corresponding one of the segments of the ridge part.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

DETAILED DESCRIPTION

Figure 1:
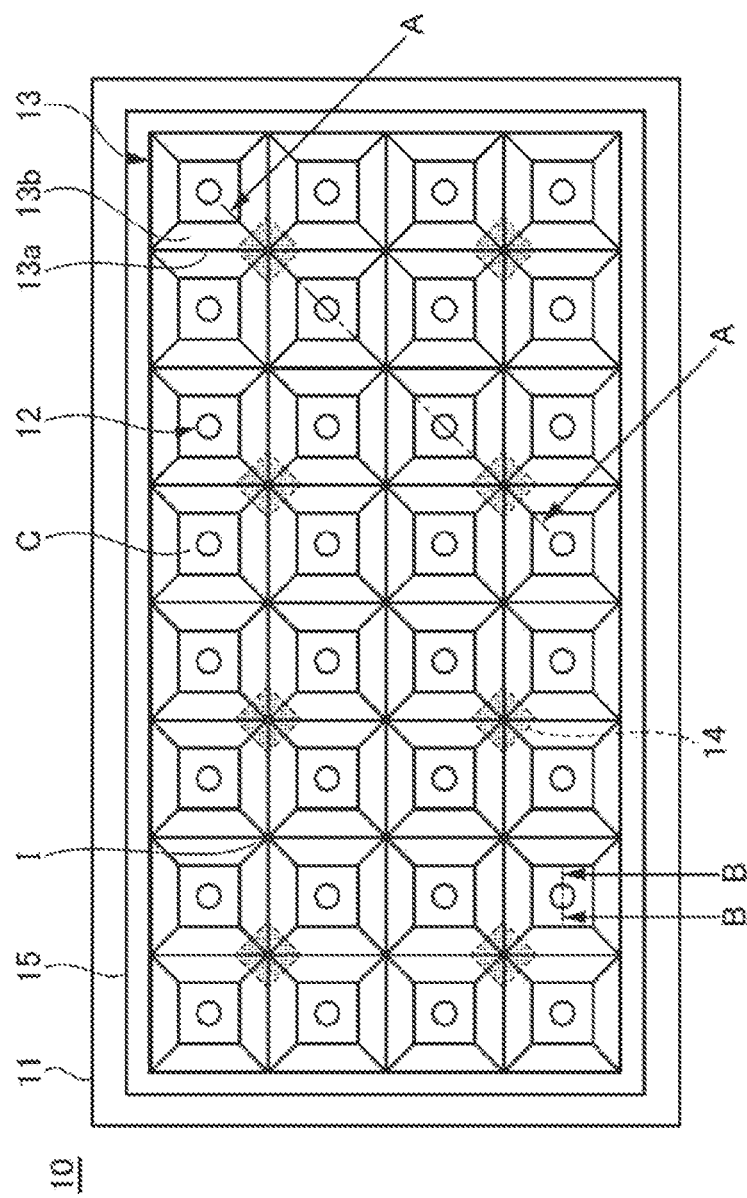
FIG. 1 is a schematic top view exemplifying a light-emitting device according to a first embodiment of the present disclosure.

In the following, embodiments for carrying out the present inventive concept will be described with reference to the drawings. According to an embodiment in the present disclosure, it is possible to make a light-emitting device including an integrated circuit smaller.

Note that in the following description, although a term indicating a particular direction or position (e.g., "upper", "lower", or any other term including these terms) is used where necessary, such use is to facilitate understanding of the present inventive concept by referring to the drawings, and not intended to limit the technical scope according to the present inventive concept by the meaning of such a term. Also, parts having the same reference number in multiple figures designate the same or equivalent parts or members.

Further, embodiments described below exemplify light-emitting devices and liquid crystal display device for implementing technical concepts of the present inventive concept, and the present inventive concept is not limited as described below. Also, the dimensions, materials, shapes, relative arrangement, and the like of the components described below are not intended to limit, but intended to exemplify the scope of the present inventive concept, unless accompanied by specific description. Also, the contents described in one embodiment can also be applied to the other embodiments and modified examples. Also, there may be cases where the sizes and positional relationship of members illustrated in the drawings are exaggerated to clarify the description.

First Embodiment (Light-Emitting Device 10)

Figure 2:
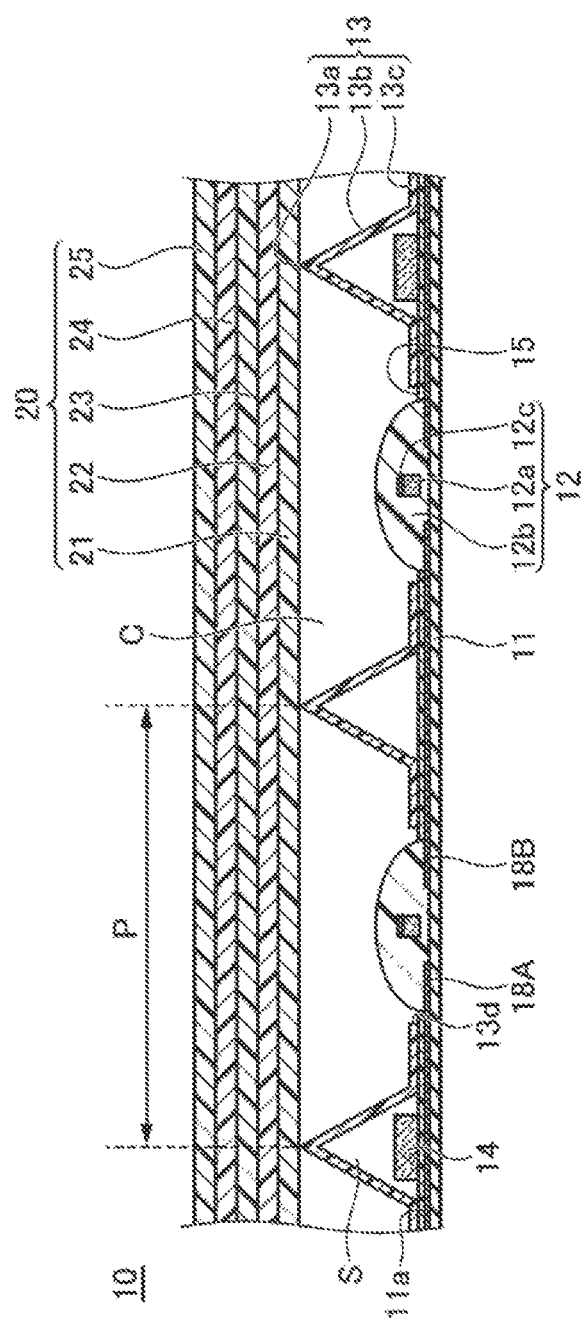
FIG. 2 is a first schematic partially-enlarged cross-sectional view exemplifying a light-emitting device according to the first embodiment of the present disclosure.
Figure 3:
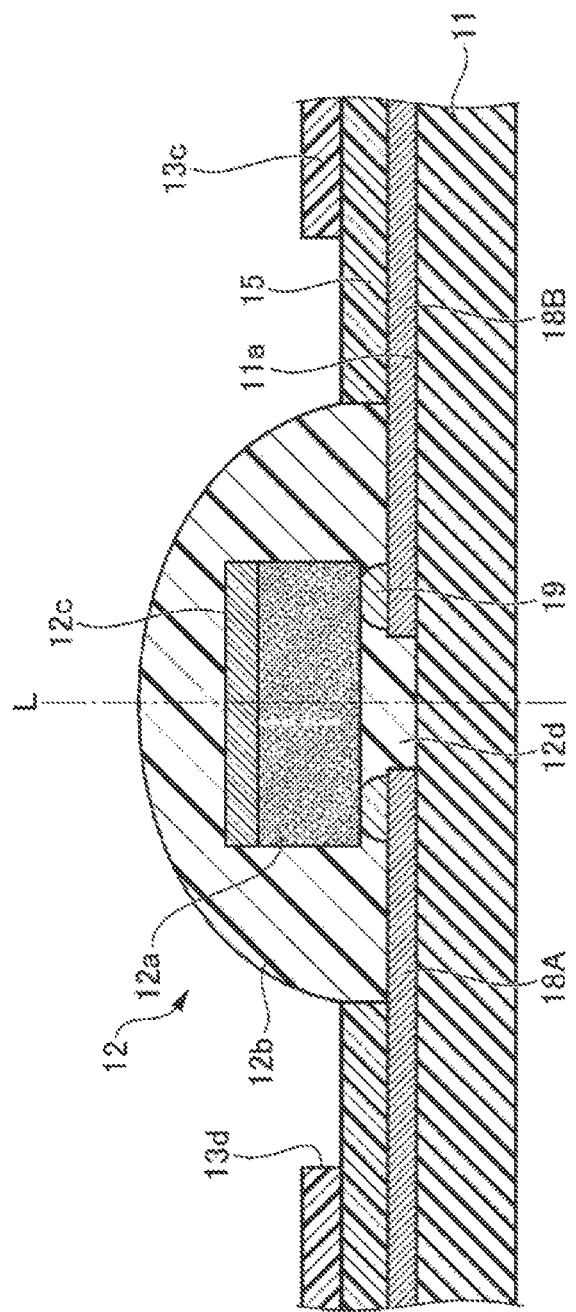
FIG. 3 is a second schematic partially-enlarged cross-sectional view exemplifying a light-emitting device according to the first embodiment of the present disclosure.
Figure 4:
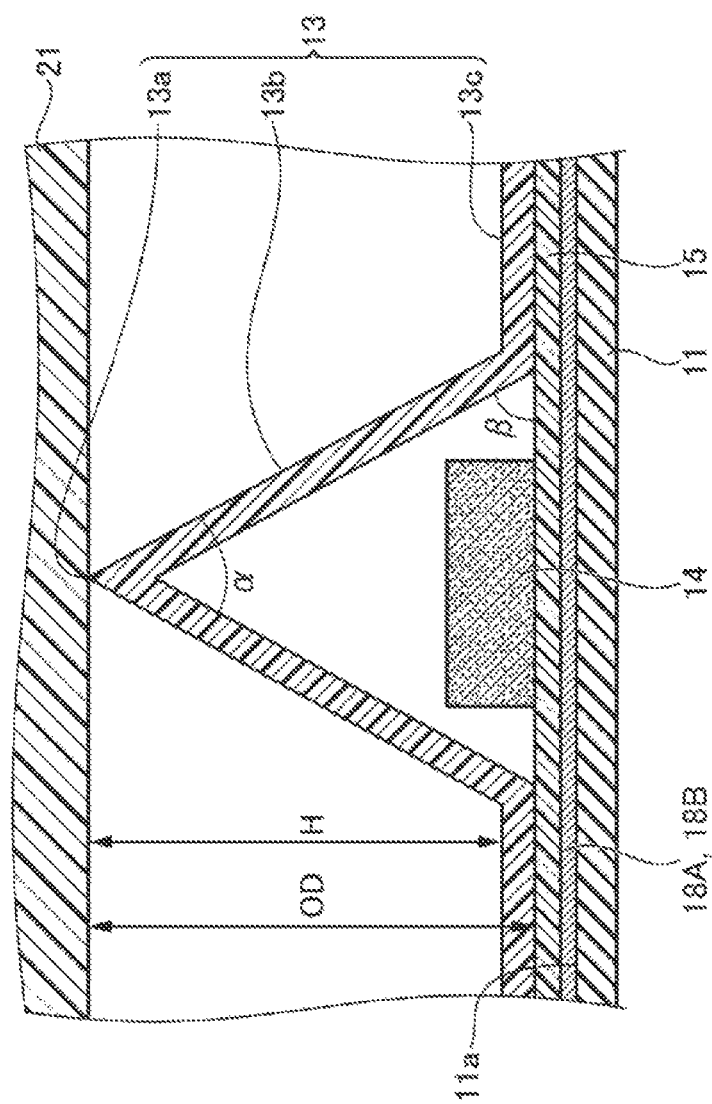
FIG. 4 is a schematic partially-enlarged cross-sectional view in the vicinity of a wall part of a sectioning member of the light-emitting device shown in FIG. 2.

FIG. 1 is a schematic top view exemplifying a light-emitting device according to a first embodiment. FIG. 2 is a schematic partially-enlarged cross-sectional view exemplifying the light-emitting device according to the first embodiment, and illustrates a cross section taken along the line A-A in FIG. 1. FIG. 3 is a schematic partially-enlarged cross-sectional view exemplifying the light-emitting device according to the first embodiment, and illustrates a cross section taken along the line B-B in FIG. 1. FIG. 4 is a schematic partially-enlarged cross-sectional view in the vicinity of a wall part of a sectioning member of the light-emitting device in FIG. 2. Note that FIG. 1 illustrates the sectioning member 13 and the other members on the lower side of the sectioning member 13 in FIG. 2.

As illustrated in FIGS. 1 to 4, the light-emitting device 10 is a surface-emission-type light-emitting device that includes a board 11, light sources 12, a sectioning member 13, and integrated circuits 14.

In the following description, it is assumed that "top view" refers to viewing an object in the normal direction from the upper surface 11a of the board 11, and a "planar shape" refers to a shape of an object viewed in the normal direction of the upper surface 11a of the board 11.

The light-emitting device 10 can include a diffusion plate 21 as an optical member disposed above the light sources 12, where the sectioning member 13 is interposed in-between. The light-emitting device 10 including the diffusion plate 21 can improve the uniformity of light. The light-emitting device 10 can further include, above the diffusion plate 21, at least one selected from the group consisting of a wavelength conversion sheet 22, a first prism sheet 23, a second prism sheet 24, and a polarization sheet 25. The light-emitting device 10 including at least one of these optical members 20 can further improve the uniformity of light.

On the board 11, multiple light sources 12 are disposed, each of which includes a light-emitting diode. In the present embodiment, although 32 light sources 12 are disposed on the board 11, this arrangement is merely an example; any number of light sources 12 can be disposed on the board 11.

The sectioning member 13 is disposed on the same side of the board 11 as the light sources 12. The sectioning member 13 includes a ridge part 13a having a grid pattern in a top view, and a wall part 13b to surround the light sources 12 in top view, to form multiple regions each surrounding a corresponding one of the light sources 12. The wall part 13b of the sectioning member 13 extends, for example, from the ridge part 13a toward the board 11, and the interval between two adjacent portions of the wall part 13b joining each other along a segment of the ridge part becomes wider toward the board 11 as shown in FIG. 4. A space S is formed between the back surface of the wall part 13b of the sectioning member 13 and the board 11.

A range (i.e., a region and a space) surrounded by four portions of the wall part 13b is defined as one section C, and the sectioning member 13 forms multiple sections C. The wall part 13b of the sectioning member 13 can be arranged in a grid in top view. In top view, the boundary between two sections C adjacent to each other can be regarded as a segment of the ridge part 13a. It is favorable that the sectioning member 13 has a bottom surface 13c in each section C. In other words, it is favorable that the sectioning member 13 forms each section C with a bottom surface 13c and portions of the wall part 13b.

In the present embodiment, one light source 12 is disposed in each section C. However, two or more light sources 12 can be disposed in each section C. In this case, for example, three light sources 12 of red color, green color, and blue color can be disposed in each section C. Alternatively, two light sources 12 of cool white color and warm white color can be disposed in each section C.

The integrated circuit 14 is disposed on the same side of the board 11 on which the light sources 12 are disposed. The integrated circuit 14 is an integrated circuit to drive the light sources 12. In the present embodiment, one integrated circuit 14 is capable of driving four light sources 12. One integrated circuit 14 capable of driving two or more light sources 12 is suitable for making the light-emitting device 10 smaller. However, this is merely an example; one integrated circuit 14 can drive one to three light sources 12, or can drive five or more light sources 12.

Each integrated circuit 14 has a square or rectangle shape in top view, and disposed in the space S formed between the back surface of the wall part 13b of the sectioning member 13 and the board 11. Note that here, a "square shape" or "rectangle shape" does not mean a "square shape" or "rectangle shape" in a strict sense; rather, it means substantially or approximately a "square" or "rectangle". For example, a shape having rounded or chamfered corners may be considered to be a "square" or "rectangle".

In the following, the elements constituting the light-emitting device 10 will be described in detail.

(Board 11)

The board 11 is a member on which multiple light sources 12 are mounted, and as illustrated in FIG. 3, includes conductive wires 18A and 18B for supplying power to the light sources 12 such as light-emitting elements 12a on the upper surface 11a of the board 11. It is preferable that a cover member 15 covers portions of the conductive wires 18A and 18B that do not serve as electrical contacts.

The material of the board 11 simply needs to be capable of insulating and separating at least a pair of conductive wires 18A and 18B; for example, ceramics, resin, composite materials, and the like can be used. As the ceramics, for example, alumina, mullite, forsterite, glass ceramics, nitride-based materials (e.g., AlN), carbide-based materials (e.g., SiC), LTCC, and the like can be used. As the resin, phenolic resin, epoxy resin, polyimide resin, BT resin, polyphthalamide (PPA), polyethylene terephthalate (PET), and the like can be used. As the composite materials, materials in which a resin described above is mixed with an inorganic filler such as glass fiber, $SiO_2$, $TiO_2$, or $Al_2O_3$, glass-fiber reinforced resin (glass epoxy resin), and the like can be used. The board 11 can be a metal board including an insulating layer formed on a metal member.

The thickness of the board 11 can be selected appropriately. The board 11 can be either a flexible board that can be manufactured by roll-to-roll processing, or a rigid board. A rigid board can be a thin rigid board that can be curved. The material of the conductive wires 18A and 18B is not limited in particular as long as being conductive, and materials commonly used as wiring layers of circuit boards and the like can be used. On the surfaces of the conductive wires 18A and 18B, a plating film, light reflecting film, or the like can be formed.

It is preferable that the cover member 15 is formed of an insulative material. As the material of the cover member 15, materials similar to those exemplified as the materials of the board 11 and the like can be used. By using a resin described above in which a white filler or the like is contained as the cover member 15, leakage or absorption of light can be suppressed, and thereby, to improve the light extraction efficiency of the light-emitting device 10.

(Light Source 12)

The light source 12 is a member to emit light, that includes, for example, a light-emitting element that itself emit light; a member having a light-emitting element encapsulated with a light-transmitting resin; a surface-mount-type light-emitting device (also called an LED) having a light-emitting element packaged; and the like. For example, as illustrated in FIG. 3, the light-emitting element 12a covered with an encapsulant 12b can be used as the light source 12. The light source 12 can include a single light-emitting element 12a, or can use multiple light-emitting elements in the single light source 12.

Although the light distributions of the light source 12 is not particularly limited, it is preferable to have broad light distribution in order to emit light in each section C surrounded by the wall part 13b of the sectioning member 13 with less little unevenness of the brightness. In particular, it is preferable that each of the light sources 12 has a batwing light distribution characteristic. This can suppress the amount of light emitted from the light source 12 in the upright direction, and widen the light distribution of each light source 12. The widened light irradiates the wall part 13b and the bottom surface 13c, and therefore it is possible to suppress unevenness of the brightness in each section C surrounded by the wall part 13b.

In the present disclosure, a batwing light distribution characteristic is defined as a characteristic that has an emission intensity distribution in which the light emission intensity is higher at a light distribution angle whose absolute value is greater than 0 degrees, than the light emission intensity at 0 degrees, where 0 degrees correspond to the optical axis L. As illustrated in FIG. 3, the optical axis L is defined as a line that passes through the center of the light source 12, and intersects perpendicularly with the upper surface 11a of the board 11.

In particular, as the light source 12 having a batwing light distribution characteristic, for example, as illustrated in FIG. 3, a light source that uses a light-emitting element 12a including a light-reflective film 12c formed on the upper surface, and the like can be considered. By providing the light-reflective film 12c on the upper surface of the light-emitting element 12a, light upwardly emitted from the light-emitting element 12a is reflected by the light-reflective film 12c, the amount of light toward upright direction from the light-emitting element 12a is suppressed, and a batwing light distribution characteristic can be obtained. The light-reflective film 12c can be formed directly on the light-emitting element 12a; therefore, it is not necessary to combine special lenses to obtain a batwing light distribution, and thereby, it is possible to reduce the thickness of the light source 12.

The light-reflective film 12c can be formed of any one of a metallic film such as silver or copper, a multilayer dielectric film (DBR film), a resin containing a white filler, and a combination of these. It is preferable that the light-reflective film 12c has an angle dependence of reflectance with respect to the incident angle of the emission wavelength of the light-emitting element 12a. Specifically, it is preferable that the reflectance of the light-reflective film 12c is set to be lower for oblique incidence than for the vertical incidence. This can make the change in brightness directly above the light-emitting element 12a moderate, and can suppress the top of the light-emitting element 12a from becoming extremely dark such as becoming a dark point.

The light source 12 can include, for example, a light-emitting element 12a mounted directly on the board 11 that has a height of 100 μm to 500 μm. The light-reflective film 12c can have a thickness between 0.1 μm and 3.0 μm. Even if including the encapsulant 12b, the thickness of the light source 12 can be within a range around 0.5 mm to 2.0 mm.

It is preferable that the multiple light sources 12 can be driven independently from each other by the integrated circuit 14, and are wired on the board 11 such that dimming control (e.g., local dimming or operating in a high dynamic range) is enabled for each light source 12.

(Light-Emitting Element 12a)

As the light-emitting element 12a, known elements can be used. For example, it is preferable to use a light-emitting diode as the light-emitting element 12a. As the light-emitting element 12a, an element having appropriately selected wavelength can be selected. For example, as a light-emitting element of blue color or green color, a nitride-based semiconductor such as GaN, InGaN, AlGaN, AlInGaN, or the like can be used. Also, as a light-emitting element of red color, GaAlAs, AlInGaP, or the like can be used. Further, a semiconductor light-emitting element formed of other materials can be used. The composition, luminescent color, size, and number of the light-emitting elements to be used can be selected appropriately depending on the purpose.

As illustrated in FIG. 3, the light-emitting element 12a can be flip-chip mounted via the bonding members 19, so as to straddle a pair of positive and negative conductive wires 18A and 18B provided on the upper surface 11a of the board 11. However, the light-emitting element 12a can be face-up mounted, other than flip-chip mounted.

The bonding member 19 is a member to fix the light-emitting element 12a to the board or the conductive wire. The bonding member 19 can be an insulative resin, a conductive member, or the like. In the case of the flip-chip mount as illustrated in FIG. 3, a conductive member is used. Examples of materials for the conductive member include Au-containing alloy, Ag-containing alloy, Pd-containing alloy, In-containing alloy, Pb—Pd-containing alloy, Au—Ga-containing alloy, Au—Sn-containing alloy, Sn-containing alloy, Sn—Cu-containing alloy, Sn—Cu—Ag-containing alloy, Au—Ge-containing alloy, Au—Si-containing alloy, Al-containing alloy, Cu—In-containing alloy, a mixture of metal and flux, and the like.

(Encapsulant 12b)

The encapsulant 12b covers the light-emitting element 12a in order to protect the light-emitting element 12a from the external environment, and at the same time, to optically control light emitted from the light-emitting element 12a. The encapsulant 12b is formed of a light-transmissive material. As the material of the encapsulant 12b, light-transmissive resin such as epoxy resin, silicone resin, resin having these resins mixed, glass, and the like can be used. Among these, it is preferable to use silicone resin in consideration of the light resistance and ease of molding. The encapsulant 12b can contain a diffuser for diffusing light from the light-emitting element 12a, a colorant corresponding to the color of emitted light of the light-emitting element 12a, and the like. As the diffuser, colorant, and the like, known materials in this technical field can be used.

The encapsulant 12b can be in direct contact with the board 11. The encapsulant 12b is adjusted to have a viscosity so that printing, dispenser application, or the like can be performed, and curable by heat treatment or light irradiation. Examples of the shape of the encapsulant 12b include for example, a substantially hemispherical shape; a vertically-elongated protruding shape in cross-sectional view; a laterally-elongated protruding shape in cross-sectional view; a circular or elliptical shape in top view, and the like. In the present disclosure, the "vertically-elongated protruding shape" is a shape in which the maximum length in the direction perpendicular to the upper surface 11a of the board 11 is longer than the maximum length in the direction parallel to the upper surface 11a of the board 11 in cross-sectional view. Also, the "laterally-elongated protruding shape" is a shape in which the maximum length in the direction parallel to the upper surface 11a of the board 11 is longer than the maximum length in the direction perpendicular to the upper surface 11a of the board 11 in cross-sectional view. The encapsulant 12b can also be disposed as an underfill 12d between the lower surface of the light-emitting element 12a and the upper surface 11a of the board 11.

(Sectioning Member 13)

It is preferable that the sectioning member 13 has a reflectance. A through-hole 13d is formed at substantially the center of the bottom surface 13c in a section C. As illustrated in FIG. 1 and the like, it is preferable to dispose the light source 12 in the through-hole 13d. The shape and size of the through-hole 13d simply need to a shape and a size to expose the entire light source 12; and it is preferable to have the edge of the sectioning member 13 defining the through-hole 13d be positioned only adjacent to the light source 12. In this way, in the case of the sectioning member 13 having a reflectance, it is possible to reflect light from the light source 12 also on the bottom surface 13c, and thereby, to improve the efficiency of light extraction.

The ridge part 13a corresponds to the highest portions of the wall part 13b. The ridge part 13a can be flat, but it is preferable to have an angled shape in the vicinity of the ridge part 13a. In other words, it is preferable that the vertical cross section of the wall part 13b constituting the ridge part 13a forms an acute-angled triangle, and it is more preferable to form an acute-angled isosceles triangle.

It is preferable to set the acute angle of the acute-angled triangle or the acute-angled isosceles triangle, namely, the angle formed by the wall part 13b at the ridge part 13a ($\alpha$ in FIG. 4) within, for example, 60 degrees to 90 degrees. By setting the angle within such a range, it is possible to reduce the space and the regions occupied by the sectioning member 13, to reduce the height of the sectioning member 13, and thereby, to make the light-emitting device 10 smaller and thinner.

The pitch P between two adjacent and parallel segments of the ridge part 13a of the sectioning member 13 can be adjusted appropriately depending on the size of the light source to be used, the intended size, performance, and the like of the light-emitting device. The pitch P can be, for example, 1 mm to 50 mm, favorably 5 mm to 20 mm, and more favorably 6 mm to 15 mm. It is preferable that portions of the wall part 13b that surround a light source 12 are constituted with the bottom surface 13c and inclined surfaces extending upward from the vicinity of the upper surface 11a of the board 11, in the section C. The angle ($\beta$ in FIG. 4) formed between a portion of the wall part 13b and the bottom surface 13c in the space S is, for example, 45 degrees to 60 degrees.

Preferably, the height of the sectioning member 13 itself, namely, the height from the lower surface of the bottom surface 13c of the sectioning member 13 to the ridge part 13a is less than or equal to 8 mm; and in the case of forming a thinner light-emitting device, it is preferable to be 1 mm to 4 mm. It is preferable that the distance from the lower surface of the bottom surface 13c of the sectioning member 13 to the diffusion plate 21 is about 8 mm or shorter; and in the case of forming a thinner light-emitting device, it is preferable to be about 2 mm to about 4 mm. This can make a backlight unit including optical members such as the diffusion plate 21 relatively thin. The thickness of the sectioning member 13 can be, for example, in a range of 100 µm to 300 µm.

The shape of a section C formed by the sectioning member 13 surrounding the light source 12, namely, the shape of a region sectioned by the wall part 13b can be, for example, circular, elliptical, or the like in top view. However, in order to efficiently arrange multiple light sources 12, the shape is favorably a polygon, such as a triangle, square, hexagon, or the like. This can make it easier to section the surface into an appropriate number of regions by the wall part 13b depending on the area of the light-emitting surface of the light-emitting device 10, and it is possible to arrange the light-emitting regions with a high density.

The number of sections C sectioned by the wall part 13b can be appropriately determined, and depending on the desired size of the light-emitting device, the shape and arrangement of the wall part 13b, the number of sections C, and the like can be changed. Depending on the number and positions of the light sources 12 disposed on the board 11, the sectioning member 13 can have various shapes in top view, for example, a shape in which three sections C are adjacent to each other and the ends of three segments of a ridge part are converged at one end; a shape in which four sections C are adjacent to each other and the ends of four segments of the ridge part 13a are converged in a top view as illustrated in FIG. 1; a shape in which six sections C are adjacent to each other and the ends of six segments of a ridge part are converged at one point; and the like.

It is preferable that the sectioning member 13 is disposed on the board 11, and it is preferable that the lower surface of the bottom surface 13c of the sectioning member 13 is fixed to the upper surface 11a of the board 11. In particular, in order to suppress light emitted from the light source 12 from entering between the board 11 and the sectioning member 13, it is preferable to fix the perimeter of the through-hole 13d by using a light-reflective adhesive member. For example, it is more preferable to provide the light-reflective adhesive member in an annular shape along the outer edge of the through-hole 13d. The adhesive member can be a double-sided tape, a hot-melt adhesive sheet, or a resin-based adhesive such as a thermoset resin or a thermoplastic resin. It is preferable that these adhesive members have high flame retardance. However, the sectioning member 13 can be fixed to the board 11 by using screws or the like.

As described above, it is preferable that sectioning member 13 have light reflectance. This can make it possible to efficiently reflect light emitted from the light source 12 by the wall part 13b and the bottom surface 13c. In particular, in the case in which the wall part 13b has inclined portions as described above, the wall part 13b is irradiated with light emitted from the light source 12, and the light can be reflected in the upward direction. Therefore, the contrast ratio can be further improved even in the case in which the light source in one section C is turned on and the light source in the adjacent section C is turned off. Also, the light can efficiently be reflected in the upward direction.

The sectioning member 13 can be molded using a resin or the like containing a reflective material made of metal oxide particles such as titanium oxide, aluminum oxide, silicon oxide, or the like, or can be molded with a resin that does not contain a reflective material, and then, provided with a reflective material on the surface. It is preferable that the sectioning member 13 is set to have a reflectance of greater than or equal to 70% with respect to light emitted from the light source 12.

The sectioning member 13 can be formed by a forming method using a metal mold, a forming method using optical fabrication, or the like. As the forming method using a metal mold, forming methods such as injection molding, extrusion molding, compression molding, vacuum molding, pressure molding, press molding, or the like can be applied. For example, by performing vacuum forming using a reflective sheet formed of PET or the like, it is possible to form a sectioning member 13 in which the bottom surface 13c is integrated with the wall part 13b.

In the sectioning member 13, multiple sections C are arrayed in a row direction, in a column direction, or in a matrix. For example, in FIG. 1, 32 sections C, each virtually square in top view, are demarcated on the board 11 to have 32 units (multiplying 4 by 8) of the light sources 12 arrayed in a matrix, where at least one of the light sources 12 is surrounded by each of the portions of the wall part 13b. The sectioning member 13 defines the through-holes 13d in which the light sources 12 are mounted, for example, on the bottom surface 13c at substantially the center of each section C.

(Integrated Circuit 14)

The integrated circuit 14 is electrically connected to conductive wires provided on the board 11 via bonding members such as solder. The integrated circuit 14 can be of a QFP (Quad Flat Package) type, a BGA (Ball Grid Array) type, a CSP (Chip Scale Package) type, or any other type. The integrated circuit 14 has terminals to be connected to the conductive wires 18A and 18B in order to supply power to at least the light sources 12 such as the light-emitting elements 12a, and power input terminals (a positive terminal and a negative terminal).

The integrated circuit 14 can be disposed at a position, for example, that overlaps in the top view, an intersection I of segments of the ridge part 13a of the sectioning member 13. Although the shape of the section C is a square in the example in FIG. 1, even in the case in which the shape of the section C is another polygon such as a triangle or a hexagon, the integrated circuit 14 can be disposed at a position that overlaps the intersection I of the segments of the ridge part 13a.

The integrated circuit 14 having, for example, a square or rectangle shape can be disposed such that its sides become oblique with respect to segments of the ridge part 13a of the sectioning member 13. In the top view, the integrated circuit 14 can be disposed at a position where the corners of the integrated circuit 14 overlap segments of the ridge part 13a of the sectioning member 13. For example, the integrated circuit 14 having a square or rectangle shape can be disposed such that its sides become oblique by an angle of 45 degrees with respect to segments of the ridge part 13a of the sectioning member 13. By such an arrangement in which the sides of the square or rectangle of the integrated circuit 14 become oblique by the angle of 45 degrees with respect to the segments of the ridge part 13a of the sectioning member 13, it is possible to increase the distance with which the integrated circuit 14 does not interfere with the inner wall surfaces of the wall part 13b of the sectioning member 13.

By disposing the integrated circuit 14 obliquely at a position that overlaps the intersection I of segments of the ridge part 13a of the sectioning member 13, it is possible to efficiently arrange the integrated circuit 14 even in the case in which the space S is narrower, and to make the size of the light-emitting device 10 further smaller.

Figure 5:
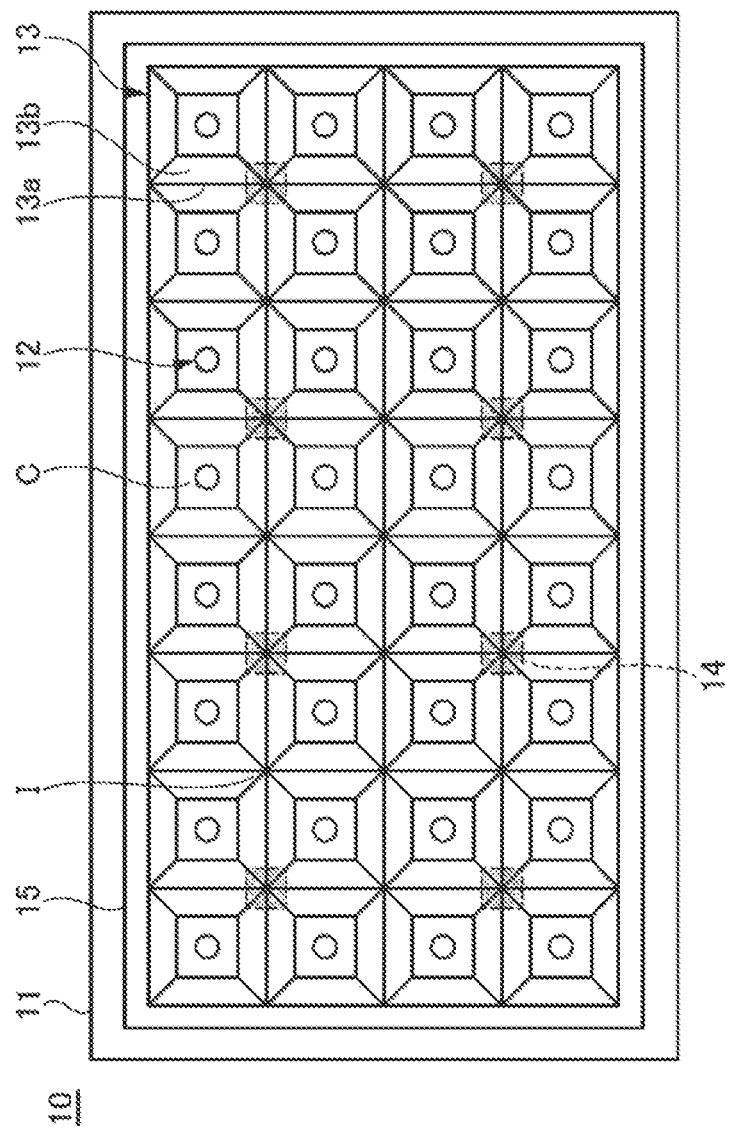
FIG. 5 is a first schematic top view illustrating another example of arrangement of integrated circuits.

However, as illustrated in FIG. 5, in the top view, the integrated circuit 14 can be disposed at a position that overlaps the intersection I of the segments of the ridge part 13a, such that the sides of the square or rectangle are parallel or perpendicular to the segments of the ridge part 13a.

Figure 6:
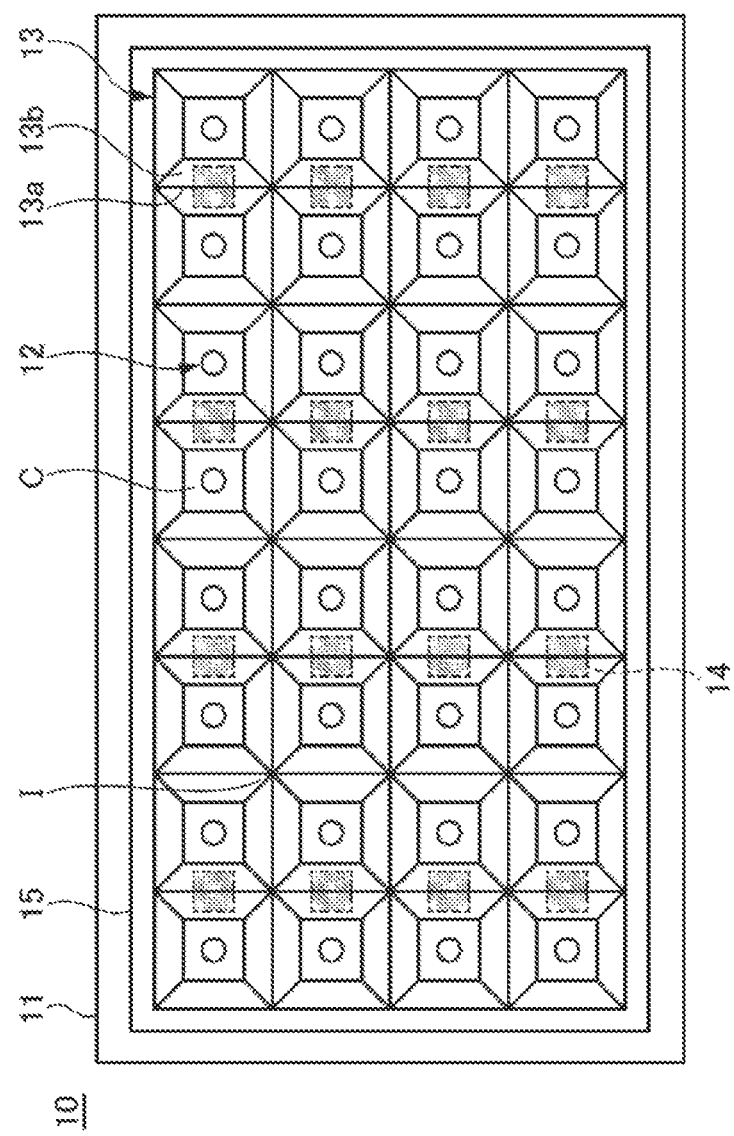
FIG. 6 is a second schematic top view illustrating another example of arrangement of integrated circuits.

As illustrated in FIG. 6, in top view, the integrated circuit 14 can be disposed at a position that does not overlap the intersection I of the segments of the ridge part 13a. In the example in FIG. 6, the sides of the square integrated circuit 14 are parallel or perpendicular to the segments of the ridge part 13a. In the example in FIG. 6, one integrated circuit 14 is capable of driving four light sources 12.

Figure 7:
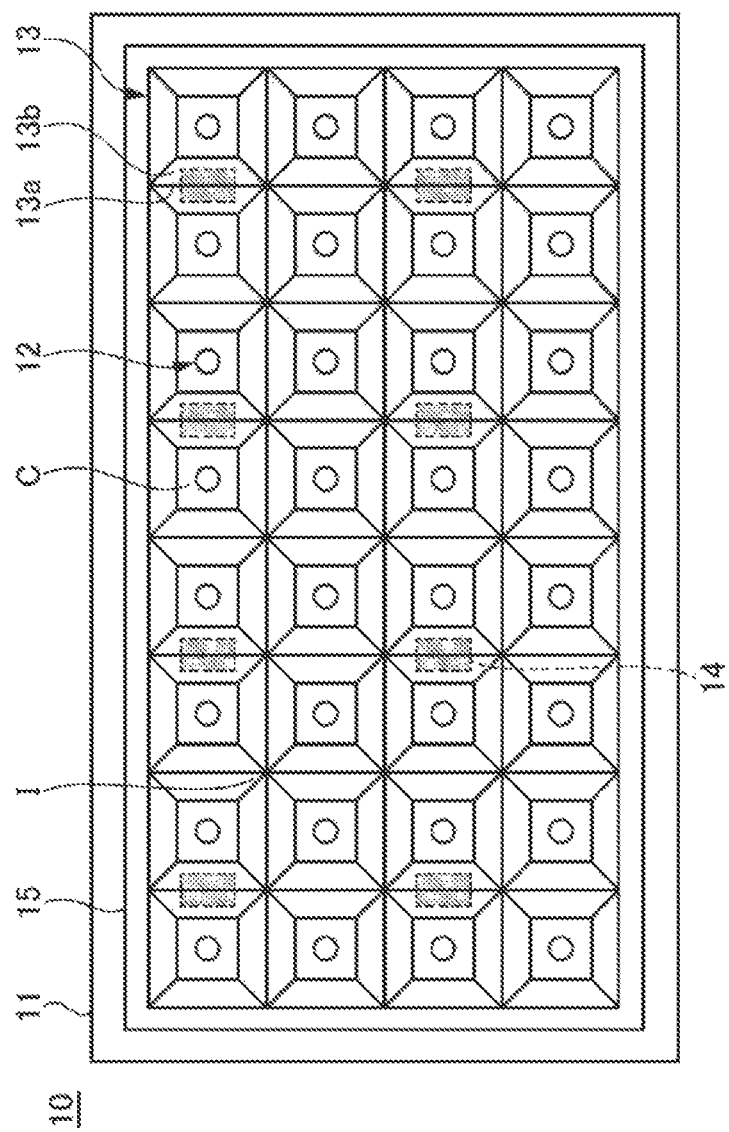
FIG. 7 is a third schematic top view illustrating another example of arrangement of integrated circuits.

As illustrated in FIG. 7, the integrated circuit 14 can be rectangular in a top view. In the example in FIG. 7, the sides of the rectangular integrated circuit 14 are parallel or perpendicular to segments of the ridge part 13a. The rectangular integrated circuit 14 can be disposed at a position that overlaps the intersection I of the segments of the ridge part 13a.

Figure 8:
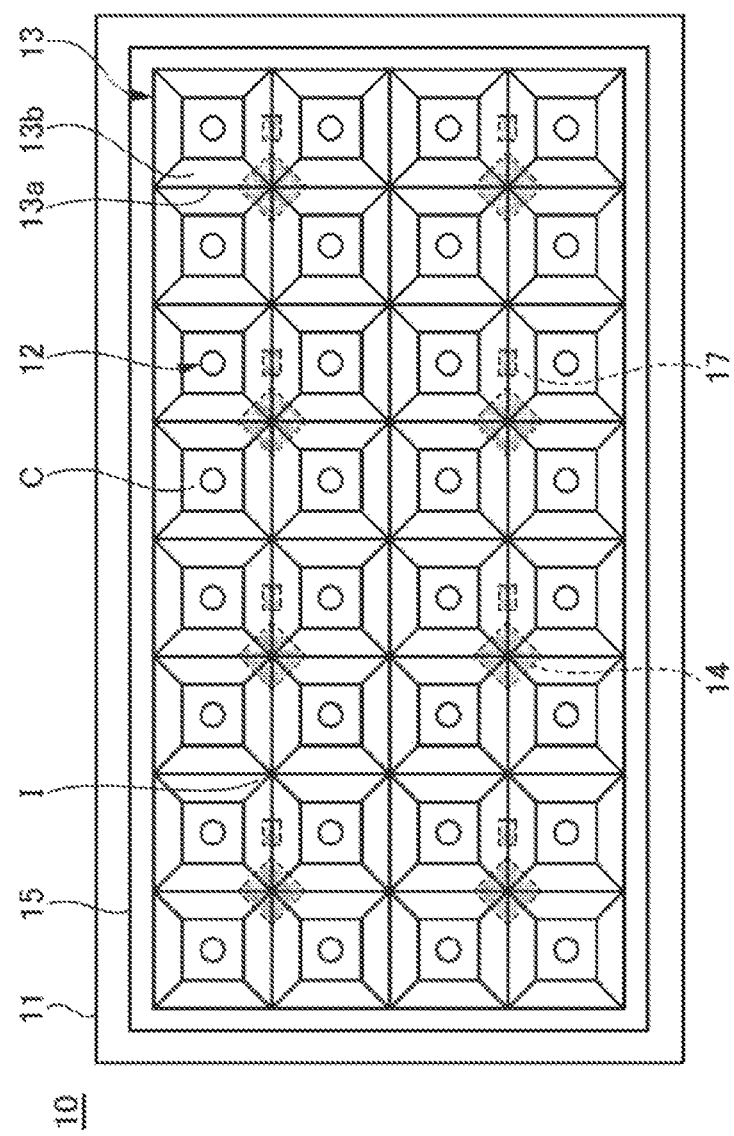
FIG. 8 is a fourth schematic top view illustrating another example of arrangement of integrated circuits.

As illustrated in FIG. 8, in some cases, a passive component 17 is electrically connected to the integrated circuit 14, and in such a case, the passive component 17 can be placed at any position in the space S. The passive component can be, for example, a capacitor, but not limited to this, and can be a resistor, an inductor, or the like. Passive components 17 to be connected to a single integrated circuit 14 can be all the same type or the different types. In these cases also, all passive components 17 can disposed at any positions in the space S.

In the space S where the integrated circuit 14 and/or the passive component 17 are not disposed, or other area than the area where the integrated circuit 14 and/or the passive component 17 are disposed in the space S, resin or the like can be supplied to bond the sectioning member 13 with the board 11.

In this way, by effectively using the space S to arrange the integrated circuits 14 in the space S on the same side of the board 11 as the light sources 12, it is possible to make the light-emitting device 10 smaller and thinner. Also, by disposing the integrated circuits 14 on the same side on which the board 11 as the light sources 12 are disposed, it is possible to reduce the mounting cost.

In particular, as illustrated in FIG. 1, in top view, in the case in which the square integrated circuit 14 is disposed at a position such that the sides are oblique with respect to segments of the ridge part 13a, and the corners are positioned where overlap segments of the ridge part 13a, it is possible to use the space S most effectively. For example, even in the case in which the integrated circuit 14 has a side longer than the length of the space S in the direction perpendicular to a segment of the ridge part 13a in the top view, it is possible to arrange the integrated circuit 14 in the space S.

Also, by having the integrated circuit 14 disposed in the space S, light emitted from the light source 12 is reflected by the sectioning member 13 without interference from the integrated circuit 14.

(Diffusion Plate 21)

The diffusion plate 21 is a member to diffuse and transmit incident light, and can be disposed above multiple light sources 12 as a single plate as necessary. It is preferable that the diffusion plate 21 is a flat-plate member, but the surface can have protrusion(s) and/or depression(s). It is preferable that the diffusion plate 21 is disposed to be substantially parallel to the board 11.

The diffusion plate 21 can have a first protruding part on the surface facing the board 11. The first protruding part surrounds a light source 12 in a region overlapping portions of the wall part 13b in top view. Although the first protruding part can be positioned at a central portion in the region overlapping with the portions of the wall part 13b in top view, it is preferable to be positioned to be closer to a segment of the ridge part 13a. In the present disclosure, "surround" encompasses cases where the protruding part continuously and completely surrounds the light source 12, and the protruding part surrounds the light source 12 with multiple split parts. It is preferable that the first protruding part is formed to have a shape that follows the shape of the section C, namely, the shape of the region sectioned by the wall part 13b, in the case in which the shape is, for example, a polygon such as a triangle, square, hexagon, or the like in top view. For example, in the case in which portions of the wall part 13b constituting a section has a square shape to surround the light source 12 in top view, the first protruding part can be disposed continuously or fragmentary along a rectangular path. The first protruding part can have any shape among various shapes such as a dome, ridge, pillar, frustum, or the like; for example, it is preferable to have a left-right symmetric cross-sectional shape along the center-line of the first protruding part, and it is more preferable to have a left-right symmetric dome shape. It is preferable that the first protruding part has a thickness of 10% to 30% of the portion of the diffusion plate 21 having the smallest thickness.

In addition to the first protruding part, the diffusion plate 21 can have a second protruding part on the surface facing the board 11. The second protruding part can be positioned in a region that overlaps the light source 12 in top view. The second protruding part can be positioned in a region of the light diffusion plate 21 that overlaps the light source 12 in a top view or a shape corresponding to that. Alternatively, the second protruding part can be positioned at the center of the region that overlaps the light source 12 in a top view to have a similar shape corresponding to the region. The second protruding part in a top view can have, for example, a circle, a polygon, a polygon having rounded corners, or the like. The outer edge of the second protruding part in top view can be positioned to surround the light source 12, for example, by an area of 110% or greater where the area of the region overlapping the light source 12 is assumed as 100%. It is preferable that the second protruding part has a shape so as to have the thickest portion in a region overlapping the light source 12, and it is more preferable to have the thickest portion directly above the center of the light source 12. It is preferable that the second protruding part has a left-right symmetric shape in cross section across the thickest portion. The thickness of the diffusion plate 21 at the thickest portion of the second protruding part can be set between 200% and 600% of the thinnest part of the diffusion plate 21 constituting a single section C, and favorably between 400% and 600%.

The diffusion plate 21 can be formed of a material whose light absorption is low with respect to visible light; for example, polycarbonate resin, polystyrene resin, acrylic resin, polyethylene resin, and the like. In order to diffuse incident light, the diffusion plate 21 can have protrusion(s) and/or depression(s) on the surface, or can have materials of different refractive indices dispersed in the diffusion plate 21. The protrusion and depression can have, for example, a size of 0.01 mm to 0.1 mm. The materials having different refractive indices can be selected from among, for example, polycarbonate resin, acrylic resin, and the like.

The thickness and the degree of light diffusion of the diffusion plate 21 can be set appropriately, and members commercially available as a light diffusion sheet, a diffuser film, and the like can be used. For example, the thickness of the diffusion plate 21 can be set between 1 mm and 2 mm.

Defining the pitch between two adjacent and parallel segments of the ridge part 13a of the sectioning member 13 by P, it is preferable to arrange the diffusion plate 21 to have a distance OD between the diffusion plate 21 and the light source 12, for example, being less than or equal to 0.3P, and it is more preferable to have OD being less than or equal to 0.25P. In the present embodiment, as illustrated in FIG. 4, the distance OD refers to a distance from the topmost surface of the mounting board, namely, the topmost layer in the case in which the mounting board includes a cover layer, a wiring layer, and the like over its surface, to the lower surface of the diffusion plate 21. From a different point of view, it is preferable that the diffusion plate 21 has a distance H from the upper surface of the bottom surface 13c of the sectioning member 13, for example, being 1.5 mm to 5 mm, and it is more preferable to have H being 2 mm to 3 mm.

The light-emitting device 10 can include, above the diffusion plate 21, at least one selected from the group consisting of a wavelength conversion sheet to convert light from the light source 12 into light having a different wavelength, a prism sheet, and a polarization sheet. Specifically, optical members such as a wavelength conversion sheet 22, prism sheets (a first prism sheet 23 and a second prism sheet 24), a polarization sheet 25, and the like can be disposed above the diffusion plate 21 separated by a predetermined distance or on the upper surface of the diffusion plate 21 (i.e., directly or indirectly). Additionally, a liquid crystal panel is disposed over the such optical member(s), to thereby form a surface-emission-type light-emitting device to be used as a light source for direct backlight. The position in the layers of these optical members can be appropriately determined.

(Wavelength Conversion Sheet 22)

Although the wavelength conversion sheet 22 can be disposed on either the upper surface or the lower surface of the diffusion plate 21, as illustrated in FIG. 2, it is preferable to be disposed on the upper surface. The wavelength conversion sheet 22 absorbs portion of light emitted from the light source 12, and emits light of a wavelength different from the wavelength of the light emitted from the light source 12. For example, the wavelength conversion sheet 22 absorbs portion of blue light from the light source 12 to emit yellow light, green light, and/or red light. This can achieve a light-emitting device 10 capable of emit white light. The wavelength conversion sheet 22 is separated from the light-emitting element 12a of the light source 12; therefore, a fluorescent material that is difficult to be used in the vicinity of the light-emitting element 12a due to inferior resistance to heat or light intensity, can be used. This can improve the performance of the light-emitting device 10 as the backlight. The wavelength conversion sheet 22 has a sheet shape or layer shape, and contains a fluorescent material as described above.

(First Prism Sheet 23 and Second Prism Sheet 24)

The surface of each of the first prism sheet 23 and the second prism sheet 24 has a shape in which multiple prisms extends in a predetermined direction. For example, viewing the plane of the sheet two-dimensionally in the x direction and the y direction perpendicular to the x direction, the first prism sheet 23 can have multiple prisms extending in the y-direction; and the second prism sheet 24 can have multiple prisms extending in the y-direction. The first prism sheet 23 and the second prism sheet 24 can refract light incident from various directions into a direction toward a display panel facing the light-emitting device 10. This can make it possible to emit light emitted from the light-emitting surface of the light-emitting device 10 mainly in the direction perpendicular to the upper surface, to thereby increase the brightness in the case of viewing the light-emitting device 10 from the front.

(Polarization Sheet 25)

The polarization sheet 25 can selectively transmit light in a polarization direction that coincides with the polarization direction of a polarizing plate disposed on the backlight side of the display panel, for example, a liquid crystal display panel, and reflect the polarization light in the direction perpendicular to the polarization direction toward the first prism sheet 23 and the second prism sheet 24. Portion of the polarization light returning from the polarization sheet 25 is reflected again by the first prism sheet 23, the second prism sheet 24, the wavelength conversion sheet 22, and the diffusion plate 21. At this time, the polarization direction is changed, for example, converted to a polarization light having the polarization direction of the polarizing plate of the liquid crystal display panel, and enters again the polarization sheet 25 to be emitted to the display panel. Accordingly, the light-emitting device 10 can emit light whose polarization direction is aligned, to thereby emitting light with high efficiency in the polarization direction, which is effective in improving the brightness of the display panel. As the polarization sheet 25, the first prism sheet 23, the second prism sheet 24, and the like, optical members for backlighting that is commercially available can be used.

(Reflective Member)

The light-emitting device 10 can include a reflective member. For example, the diffusion plate 21 can be have a first reflective part positioned on the upper surface above the light source 12, more preferably directly above the light source 12. In a region above the light source 12, particularly in a region directly above, the distance between the diffusion plate 21 and the light source 12 becomes the shortest. Therefore, the brightness in this region becomes high. A shorter distance between the diffusion plate 21 and the light source 12 makes unevenness of the brightness in the region directly above the light source 12 more noticeable with respect to a region other than directly above the light source 12. Therefore, by providing the first reflective part on the surface of the diffusion plate 21, part of the highly directional light of the light source 12 can be returned toward the light source 12, thereby suppressing the unevenness of the brightness.

The diffusion plate 21 can further have a second reflective part disposed on the upper surface and being above the ridge part 13a of the sectioning member 13, more favorably directly above the ridge part 13a. The ridge part 13a corresponds to regions to become boundaries between turned-off sections (i.e., the section in which the light source 12 is turned off) and turned-on sections (i.e., the section in which the light source 12 is turned on) in the case of locally dimming the light sources 12. Therefore, by providing the second reflective part at such a position, light from the turned-on section is less likely to leak into the turned-off section, and light advancing the turned-off section is directed upward with respect to the light source 12.

The first reflective part and the second reflective part can be formed of a material containing a reflective material. For example, resin, organic solvent, and/or the like containing a reflective material can be used. As the reflective material, for example, metal oxide particles such as titanium oxide, aluminum oxide, silicon oxide, and the like can be listed. The resin and the organic solvent can be selected appropriately in consideration of the metal oxide particles to be used, the characteristics required for the light-emitting device 10 to be manufactured, and the like. Among these, as the resin, it is preferable to use a resin that is light-transmissive and photocurable, and contains acrylate resin, epoxy resin, or the like as the main component.

The reflectance of the first reflective part can be the same as or can be different from that of the second reflective part. In the case of using a reflectance different from each other, it is preferable to set that the second reflective part has a smaller reflectance than the first reflective part. This is because, when performing local dimming, a part corresponding to a boundary between a turned-on part and a turned-off part is farthest from the light source 12, receives less irradiation of light, and thereby, becomes darker. Therefore, by lowering the reflectance compared to the other parts so as to improve the brightness directly above the ridge part 13a, when light sources in two adjacent sections are turned on, the boundary of the two parts can be less noticeable.

The first reflective part and the second reflective part can further contain pigments, light absorbers, fluorescent materials, and the like in the materials forming the parts. The first reflective part and the second reflective part can have various shapes or patterns, such as predetermined stripes, islands, and the like. The method of forming the first reflective part and the second reflective part can be methods known in the field, such as a printing method, ink jet method, spraying method, or the like. The thickness of the first reflective part and the second reflective part can be, for example, 10 μm to 100 μm.

The diffusion plate 21 can have the first reflective part disposed on the upper surface while being above the light source 12, more favorably directly above the light source 12, and have the second reflective part provided on the lower surface while being above the ridge part 13a of the sectioning member 13, more favorably directly above the ridge part 13a. In this case, the contrast ratio can be increased while controlling the rate of brightness to be decreased.

The diffusion plate 21 can have, on the lower surface, the first reflective part disposed above the light source 12, more favorably directly above the light source 12, and the second reflective part disposed above the ridge part 13a of the sectioning member 13, more favorably directly above the ridge part 13a.

In the case of having the first reflective part disposed on the upper surface, the diffusion length of light can be increased by the thickness of the diffusion plate 21. Also, the reflectance of the first reflective part can be smaller after scattered by the diffusion plate 21, the decreasing rate of the brightness can be suppressed. In the case of reflecting light scattered in the diffusion plate 21 in the upward direction by the second reflective part, it is preferable to provide the second reflective part on the lower surface of the diffusion plate 21. In the case of reflecting light scattered by a member on the upside of the diffusion plate 21, in the upward direction by the second reflective part, it is preferable to arrange the second reflective part on the upper surface of the diffusion plate 21.

The diffusion plate 21 can have a third reflective part on its upper surface and/or lower surface. The third reflective part is disposed directly above a portion where three or more sections C adjacent to each other, namely, a portion where three or more segments of the ridge part 13a are converged. The portion where three or more segments of the ridge part 13a are converged refers to, for example, an intersection I of the segments of the ridge part 13a and its peripheral portion. It is preferable that the third reflective part has a lower reflectance than that of the second reflective part. Among portions of the ridge part 13a that receive less irradiation of light from the light sources 12, a portion where segments of the ridge part 13a are converged becomes even darker. Therefore, by lowering the reflectance of the third reflective part to be smaller than that of the second reflective part, the unevenness of the brightness in a turned-on area can be reduced when performing local dimming. As a result, the contrast ratio can be improved.

Modified Example of the First Embodiment

In a modified example 1 of the first embodiment, an example in which a wavelength conversion sheet is not provided, will be described. In the modified example 1 of the first embodiment, the description may be omitted for the same elements as in the embodiments that have been already described.

Figure 9:
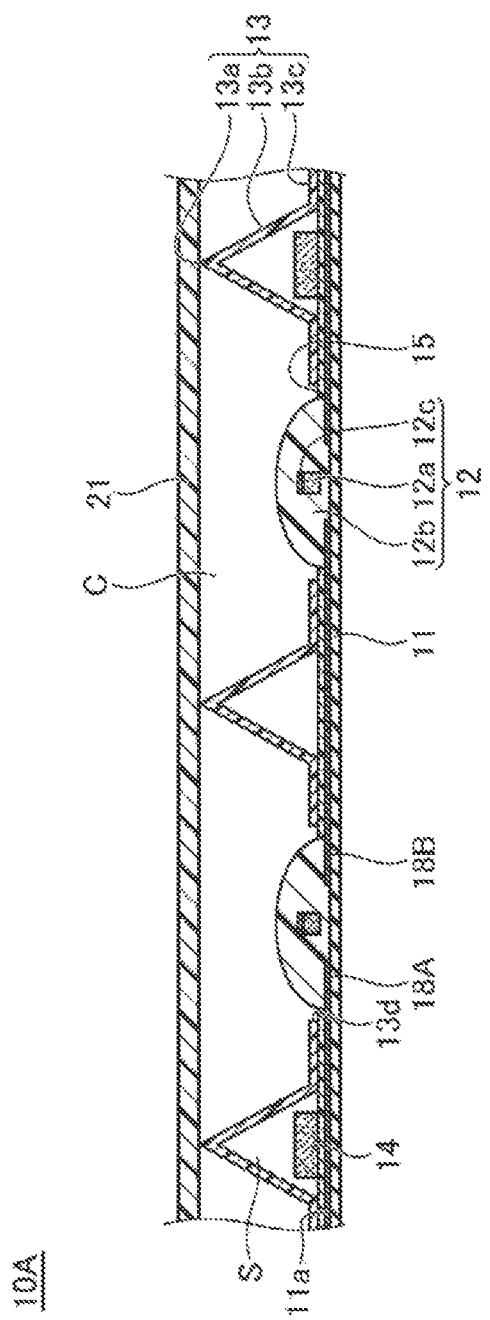
FIG. 9 is a schematic partially-enlarged cross-sectional view exemplifying a light-emitting device according to a modified example 1 of the first embodiment of the present disclosure.

FIG. 9 is a schematic partially-enlarged cross-sectional view illustrating a light-emitting device according to the modified example 1 of the first embodiment. A light-emitting device 10A illustrated in FIG. 9 does not includes a wavelength conversion sheet over the diffusion plate 21.

Instead of providing a wavelength conversion sheet, the light-emitting device 10A includes an encapsulant 12b that contains a wavelength conversion material such as a fluorescent material, in the encapsulant 12b. The wavelength conversion material absorbs light from the light-emitting element 12a, and emits light having a wavelength different from that of the light emitted from the light-emitting element 12a. In this way, the encapsulant 12b can absorb, for example, part of blue light from the light source 12 to emit yellow light, green light, and/or red light, resulting in obtaining the light-emitting device 10A emitting white light.

In addition to the wavelength conversion material, the encapsulant 12b can contain a diffuser for diffusing light from the light-emitting element 12a, a colorant corresponding to the color of light emitted from the light-emitting element 12a, and the like. For the diffuser, colorant, and the like, known materials in the field can be used.

Figure 10:
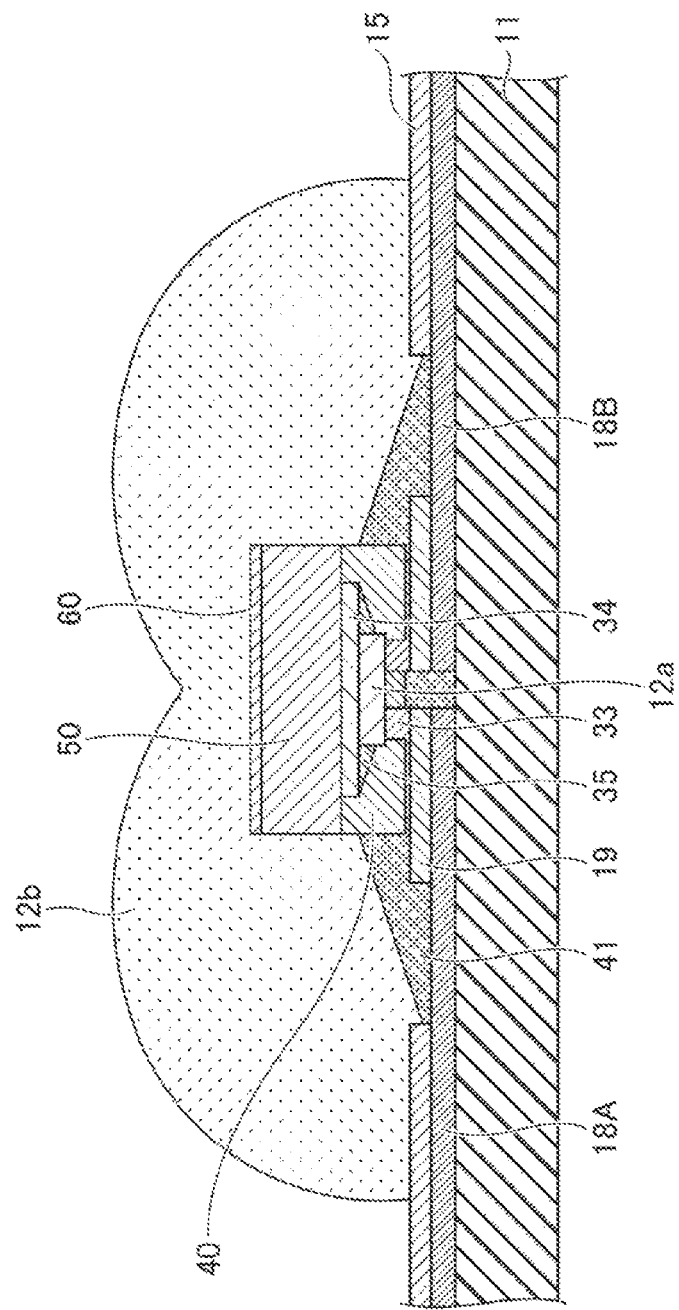
FIG. 10 is a schematic partially-enlarged cross-sectional view exemplifying a light-emitting device according to the modified example 1 of the first embodiment of the present disclosure.

Instead of the encapsulant 12b containing a wavelength conversion material such as fluorescent material or the like, for example, a light-emitting element 12a in which the nitride semiconductor is covered with a wavelength conversion material such as a fluorescent material, namely, a light-emitting element 12a that itself emits white light. A light source as illustrated in FIG. 10 can be one example thereof. In FIG. 10, a pair of positive and negative electrodes 33 of a light-emitting element 12a are connected to conductive wires 18A and 18B by bonding members 19. The light-emitting element 12a is bonded to a wavelength conversion member 34 such that the upper surface of the light-emitting element 12a is joined to the lower surface of the wavelength conversion member 34 by a bonding member or the like. The lower surface of the wavelength conversion member 34 is larger than the upper surface of the light-emitting element 12a. The entire lower surface of the wavelength conversion member 34 and part or all of the lateral surfaces of the light-emitting element 12a are covered by the element-side light-transmissive member 35. The light source 12 includes a cover member 40 containing a light-reflective material. The cover member 40 covers the lateral surfaces of the light-emitting element 12a, the element-side light-transmissive member 35, and the wavelength conversion member 34. The cover member 40 also covers the lower surface of the light-emitting element 12a while exposing the pair of positive and negative electrodes 33. The light source 12 also includes a light-transmissive member 50 on the upper surface of the wavelength conversion member 34 and the upper surface of the cover member 40, and a light-reflective layer 60 on the upper surface of the light-transmissive member 50. The light source 12 further includes a light reflective member 41 continuously on the lateral surfaces of the cover member 40 and on the upper surface of the board 11. In addition, the light source 12 also includes an encapsulant 12b that covers all of these elements. Such a light source can emit white light; and has a configuration in which the light emitted from the upper surface of the light-emitting element 12a passes through the wavelength conversion member 34, a large amount of light is emitted from the lateral surfaces of the light-transmissive member 50, and part of the light is emitted from the light-reflective layer 60 on the upper surface of the light-transmissive member 50.

The light-emitting device 10A can be provided with a prism sheet and/or a polarization sheet above the diffusion plate 21.

Second Embodiment

In the second embodiment, an example of a liquid crystal display device will be described, in which a light-emitting device according to the first embodiment is used as the backlight source. In the second embodiment, the description may be omitted for the same elements as in the embodiments that have been already described.

Figure 11:
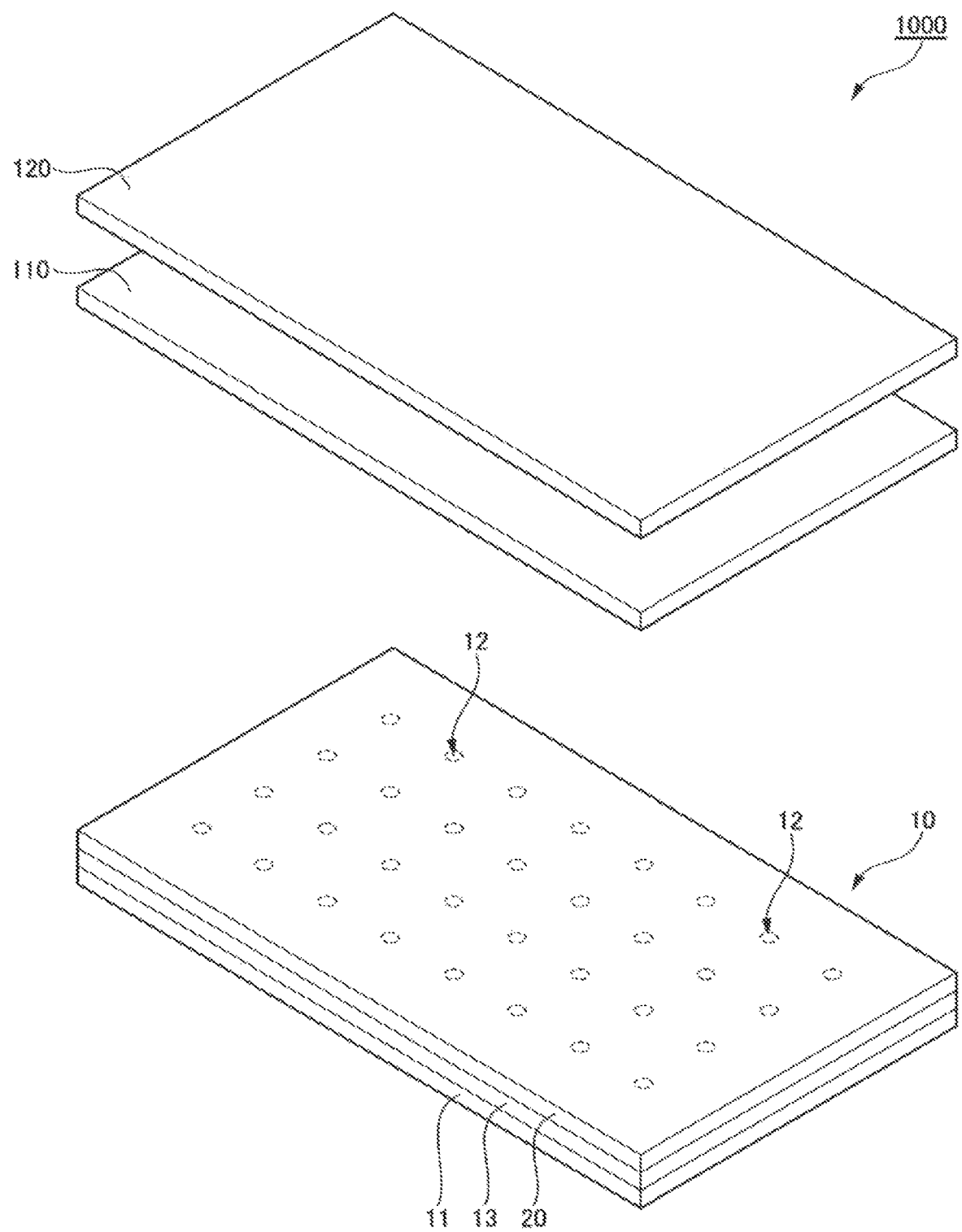
FIG. 11 is a configuration diagram exemplifying a liquid crystal display device according to a second embodiment of the present disclosure.

FIG. 11 is a configuration diagram exemplifying a liquid crystal display device according to the second embodiment. As illustrated in FIG. 11, a liquid crystal display device 1000 includes a liquid crystal panel 120, an optical sheet 110, and a light-emitting device 10 according to the first embodiment, positioned in this order from the top side. In the light-emitting device 10, a reference number 20 denotes optical members including a diffusion plate, a wavelength conversion sheet, or the like. In the present disclosure, the optical sheet 110 can include a DBEF (Dual Brightness Enhancement Film or a reflective polarization sheet), a BEF (Brightness Enhancement Film or a brightness enhancement sheet), a color filter, and the like, in addition to or partially instead of the optical members.

The liquid crystal display device 1000 is a so-called direct-type liquid crystal display device in which the light-emitting device 10 is positioned below the liquid crystal panel 120. In the liquid crystal display device 1000, the liquid crystal panel 120 is irradiated with light emitted from the light-emitting device 10. Other than the members described above, other members such as color filters can be further included.

Generally, in a direct-type liquid crystal display device, the distance between the liquid crystal panel and the light-emitting device is close, therefore, unevenness of colors and unevenness of the brightness of the light-emitting device may affect unevenness of colors and unevenness of the brightness of the liquid crystal display device. Therefore, as a light-emitting device of a direct-type liquid crystal display device, a light-emitting device having less unevenness of colors and unevenness of the brightness has been desired. By using the light-emitting device 10 in the liquid crystal display device 1000, the unevenness of the brightness and the unevenness of colors can be reduced, while maintaining the thickness of the light-emitting device 10 to be 5 mm or less, 3 mm or less, or 1 mm or less, and so on.

It is not limited to the case where single light-emitting device 10 is used as a backlight for one liquid crystal display device 1000, multiple light-emitting devices 10 can be disposed to be used as a backlight for one liquid crystal display device 1000. For example, by manufacturing and inspecting multiple small light-emitting devices 10, compared to the case of manufacturing of a single large light-emitting device 10 including a large number of light sources 12 mounted, it is possible to improve the yield.

In this way, the light-emitting device 10 is suitable to be used as the backlight for the liquid crystal display device 1000 because uniform light is emitted from the optical members 20.

However, use of the light-emitting device 10 is not limited as such, which can also be suitably used as the backlight for a television, tablet device, smartphone, smartwatch, head-up display, digital signage, bulletin board, and the like. Also, the light-emitting device 10 can also be used as the light source for lighting, and can be used for an emergency light, line lighting, various types of illumination, lights installed for vehicles, and the like. A light-emitting device 10A can be used instead of the light-emitting device 10.

As above, certain embodiments and the like have been described in detail; various modifications and substitutions can be applied to the embodiments described above without limited to the embodiments and the like described above, and without deviating from the scope described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A light-emitting device comprising:
   a board on which a plurality of light sources are disposed;
   a sectioning member including
      a ridge part having a plurality of segments that configures a grid pattern in a top view, and
      a wall part having a plurality of portions each surrounding one or more of the plurality of light sources in the top view, and extending from the ridge part toward the board such that an interval between two adjacent ones of the portions of the wall part joining each other along one of the segments of the ridge part becomes wider toward the board; and
   wherein the ridge part and the wall part form a plurality of regions to surround the plurality of light sources; and
   one or more integrated circuits configured to drive the plurality of light sources,
   wherein the sectioning member and the one or more integrated circuits are positioned on a same side of the board on which the plurality of light sources are disposed,
   wherein a space is defined between a back surface of the sectioning member and the board,
   wherein one of the one or more integrated circuits has a square shape or a rectangle shape in the top view, and is disposed at a position that overlaps an intersection of corresponding one of the segments of the ridge part in the space in the top view, such that sides of the square or sides of the rectangle are oblique with respect to the corresponding one of the segments of the ridge part, and
   wherein the space opens toward the board.

2. The light-emitting device according to claim 1, wherein the one of the integrated circuits is disposed at a position where corners of the one of the integrated circuits overlap the corresponding one of the segments of the ridge part in the top view.

3. A light-emitting device comprising:
   a board on which a plurality of light sources are disposed;
   a sectioning member including
      a ridge part having a plurality of segments that configures a grid pattern in a top view, and
      a wall part having a plurality of portions each surrounding one or more of the plurality of light sources in the top view, and extending from the ridge part toward the board such that an interval between two adjacent ones of the portions of the wall part joining each other along one of the segments of the ridge part becomes wider toward the board; and
   wherein the ridge part and the wall part form a plurality of regions to surround the plurality of light sources; and
   one or more integrated circuits configured to drive the plurality of light sources,
   wherein the sectioning member and the one or more integrated circuits are positioned on a same side of the board on which the plurality of light sources are disposed,
   wherein a space is defined between a back surface of the sectioning member and the board, and
   wherein one of the one or more integrated circuits has a square shape or a rectangle shape in the top view, and is disposed at a position that overlaps an intersection of corresponding one of the segments of the ridge part in the space in the top view, such that sides of the square or sides of the rectangle are oblique with respect to the corresponding one of the segments of the ridge part, wherein the one of the integrated circuits has a side that is longer than a length of the space in a direction orthogonal to the ridge part in the top view.

4. The light-emitting device according to claim 1, wherein the one of the integrated circuits is capable of driving two or more of the light sources.

5. The light-emitting device according to claim 1, further comprising:
   a passive component disposed in the space and being electrically connected to the one of the integrated circuits arranged in the space.

6. The light-emitting device according to claim 1, further comprising:
   a diffusion plate disposed above the light sources.

7. The light-emitting device according to claim 6, further comprising:
   at least one selected from the group consisting of a wavelength conversion sheet configured to convert light from the light sources into light having a different wavelength, a prism sheet, and a polarization sheet, disposed above the diffusion plate.

8. A liquid crystal display device comprising:
   the light-emitting device according to claim 1.

9. The light-emitting device according to claim 4, wherein the one of the integrated circuits is disposed at a position where corners of the one of the integrated circuits overlap the corresponding one of the segments of the ridge part in the top view.

10. The light-emitting device according to claim 4, wherein the one of the integrated circuits has a side that is longer than a length of the space in a direction orthogonal to the ridge part in the top view.

11. The light-emitting device according to claim 4, further comprising:
   a passive component disposed in the space and being electrically connected to the one of the integrated circuits.

12. The light-emitting device according to claim 4, further comprising:
   a diffusion plate disposed above the light sources.

13. The light-emitting device according to claim 12, further comprising:
   at least one selected from the group consisting of a wavelength conversion sheet configured to convert light from the light sources into light having a different wavelength, a prism sheet, and a polarization sheet, disposed above the diffusion plate.

14. A liquid crystal display device comprising:
   the light-emitting device according to claim 4.

15. The light-emitting device according to claim 5, wherein the one of the integrated circuits is disposed at a position where corners of the one of the integrated circuits overlap the corresponding one of the segments of the ridge part in the top view.

16. The light-emitting device according to claim 5, wherein the one of the integrated circuits has a side that is longer than a length of the space in a direction orthogonal to the ridge part in the top view.

17. The light-emitting device according to claim 5, further comprising:
   a diffusion plate disposed above the light sources.

18. The light-emitting device according to claim 17, further comprising:
   at least one selected from the group consisting of a wavelength conversion sheet configured to convert light from the light sources into light having a different wavelength, a prism sheet, and a polarization sheet, disposed above the diffusion plate.

19. A liquid crystal display device comprising:
   the light-emitting device according to claim 5.

20. The light-emitting device according to claim 1, wherein the space has a triangular shape in a cross-sectional view.

* * * * *